(12) United States Patent
Paulraj et al.

(10) Patent No.: US 6,377,632 B1
(45) Date of Patent: Apr. 23, 2002

(54) WIRELESS COMMUNICATION SYSTEM AND METHOD USING STOCHASTIC SPACE-TIME/FREQUENCY DIVISION MULTIPLEXING

(75) Inventors: Arogyaswami J. Paulraj, Stanford; Peroor K. Sebastian, Mountain View; Jose Tellado, Stanford; Robert W. Heath, Jr., Los Altos; Shilpa Talwar, Palo Alto; Helmut Bölcskei, Mountain View, all of CA (US)

(73) Assignee: Iospan Wireless, Inc., San Jose, CA (US)

( * ) Notice: Subject to any disclaimer, the term of this patent is extended or adjusted under 35 U.S.C. 154(b) by 0 days.

(21) Appl. No.: 09/490,698

(22) Filed: Jan. 24, 2000

(51) Int. Cl.[7] .................................................. H04B 7/06
(52) U.S. Cl. ....................... 375/299; 375/267; 455/101; 455/103
(58) Field of Search ................................ 375/260, 267, 375/299, 347, 349; 370/203, 211; 455/101, 103

(56) References Cited

U.S. PATENT DOCUMENTS

| | | | | |
|---|---|---|---|---|
| 5,425,050 A | * | 6/1995 | Schreiber et al. ............ | 375/141 |
| 5,457,712 A | | 10/1995 | Weerackody ................ | 375/347 |
| 5,506,861 A | * | 4/1996 | Bottomley ................... | 370/441 |
| 5,815,488 A | | 9/1998 | Williams et al. | |
| 5,848,103 A | | 12/1998 | Weerackody ................ | 375/295 |
| 5,862,192 A | | 1/1999 | Huszar et al. ............... | 375/347 |
| 5,933,421 A | | 8/1999 | Alamouti et al. | |
| 6,014,570 A | | 1/2000 | Wong et al. ................. | 455/500 |
| 6,064,662 A | | 5/2000 | Gitlin et al. | |
| 6,118,810 A | * | 9/2000 | Wynn .......................... | 375/219 |
| 6,128,330 A | * | 10/2000 | Schilling ..................... | 375/141 |
| 6,141,393 A | * | 10/2000 | Thomas et al. .............. | 375/347 |
| 6,144,711 A | | 11/2000 | Raleigh et al. | |
| 6,151,328 A | * | 11/2000 | Kwon et al. ................. | 370/441 |
| 6,185,258 B1 | | 2/2001 | Alamouti et al. ........... | 375/260 |
| 6,198,775 B1 | | 3/2001 | Khayrallah et al. ......... | 375/265 |

FOREIGN PATENT DOCUMENTS

WO          WO98/09381          3/1998

OTHER PUBLICATIONS

Paulraj, A., Taxonomy of space–time processing for wireless networks, IEE Proc—Radar Sonar Navig., vol. 145, No. 1, Feb. 1998.

* cited by examiner

*Primary Examiner*—Young T. Tse
(74) *Attorney, Agent, or Firm*—Lumen Intellectual Property Services

(57) ABSTRACT

A method and apparatus for wireless transmission of a digital bit stream. The present method employs diversity techniques to minimize multipath fading. Digital bits are converted into symbols and the symbols are provided to a number of diversity branches. Each diversity branch has its own antenna. The symbols sent to each diversity branch may be multiplied by a different phase factor or amplitude factor. The phase factors and amplitude factors may be randomly selected. Also, wireless channels can be monitored for channel quality. In this case, the channel quality measurements are used to select the phase factors and the amplitude factors. Also, the symbols can be grouped into frames before transmission. In this case, the frames can be multiplied by matrices comprising phase factors and amplitude factors. Also in this case, the frames can undergo cyclic shifting, which provides an additional measure of diversity.

11 Claims, 6 Drawing Sheets

Cyclic Shift

WIRELESS COMMUNICATION SYSTEM AND METHOD USING STOCHASTIC SPACE-TIME/FREQUENCY DIVISION MULTIPLEXING

FIELD OF THE INVENTION

The present invention relates generally to wireless communication systems and adaptive methods of operating such systems in a multipath fading environment.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

In mobile systems, for example, a variety of factors cause signal degradation and corruption. These include interference from other cellular users within or near a given cell. Another source of signal degradation is multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions summed at the antennas of the receiver.

It is also known in the communication art that transmit units and receive units equipped with antenna arrays, rather than single antennas, can improve receiver performance. Antenna arrays can both reduce multipath fading of the desired signal and suppress interfering signals or CCI. Such arrays can consequently increase both the range and capacity of wireless systems. This is true for wireless cellular telephone and other mobile systems as well as Fixed Wireless Access (FWA) systems.

In FWA systems, e.g., where the receiver and transmitter remain stationary, signal fading rate is typically less than in mobile systems. Accordingly, in FWA systems the channel coherence time (time during which the channel state estimate remains stable) is increased, since the transmitter and receiver do not move. Nevertheless, over time channel coherence is typically lost in FWA systems as well.

Antenna arrays enable a system designer to increase the total received signal power, which makes extraction of a desired signal easier. Signal recovery techniques using adaptive antenna arrays are described in detail, e.g., in the handbook of Theodore S. Rappaport, *Smart Antennas, Adaptive Arrays, Algorithms, & Wireless Position Location*; and Paulraj, A. J et al., "Space-Time Processing for Wireless Communications", IEEE Signal Processing Magazine, November 1997, pp. 49–83.

U.S. Pat. No. 5,687,194 to Paneth et al. describes a proposed Time Division Multiple Access (TDMA) communication system using multiple antennas for diversity. U.S. Pat. No. 5,952,963 to Qun Shen et al. discloses a system for using antenna selection diversity. The antenna selection is based on the receive signal strength indicators (RSSI) measured during the transmission of a preamble.

"Space-time codes for high data rate wireless communication: Performance criterion and code construction," by V. Tarokh et al, IEEE Transactions on Information Theory, V.44, No. 2, March 1998, describes joint design of coding, modulation, transmit and receive diversity to provide high performance. "A simple transmit diversity technique for wireless communications," by S. M. Almouti, JSAC V.16, No. 8, October 1998, describes a simple two branch transmit diversity scheme. In this scheme, at a given symbol period, two symbols are simultaneously transmitted from two antennas. During the next symbol period, each antenna transmits a conjugate of the symbol transmitted by the other antenna during the previous symbol period. This works almost like receive maximal ratio combining, but under the condition that the channel does not change from symbol period to symbol period. The above condition, however, is not always true.

In a multipath environment, the signal arrives at the receive antenna via multiple paths. These paths can be a combination of line of sight (LOS) and nonline of sight (NLOS) paths. When the composite received signal consists of a large number of plane waves, the received complex low pass signal can be modeled as a complex Gaussian random process. In the absence of a LOS signal component, the received signal amplitude has a Rayleigh distribution. This type of multipath fading is called Rayleigh fading. When the multipath fading channel has a LOS component, the signal amplitude has a Rician distribution. This is called Rician fading. The Rician factor K is the ratio of received power in the LOS component to that in the scattered NLOS components. When $K=0$, the channel exhibits Rayleigh fading, and when $K=\infty$, the channel does not exhibit fading. Antenna diversity is a traditional technique to combat multipath fading, but any single diversity technique is not suitable for all channel conditions. For example, delay diversity using multiple antennas is suitable when there is considerable fading (low K-factor) and delay spread in the channel. But when the channel is Rician (with high K values), the delay diversity for example can create or aggravate intersymbol interference (ISI) and frequency selective fading of a permanent nature, i.e., delay diversity can cause certain carrier frequency components to have very low signal level.

One way to solve this problem is to not use diversity when the channel is Rician. But for this, the knowledge of the channel characteristics prior to transmission is required. When such feedback is not possible, communication will be very error prone. None of the above-referenced related art teaches or suggests a method or system to overcome this latter problem.

There is a need, therefore, for a method and a system to carry out robust wireless communication through a channel in a multipath fading environment under varying channel conditions ranging from pure Rayleigh to pure Rician and varying delay spread. Particularly, there is a need to provide such a method and system to carry out robust wireless communication under conditions wherein a transmitter has no channel state information. Further, there is a need to provide a method and system to carry out robust wireless communication under such conditions with increased throughput and capacity, improved signal quality, increased resistance to multipath fading.

OBJECTS AND ADVANTAGES OF THE INVENTION

Accordingly, it is a primary object of the present invention to provide a method for wireless communications that:

1) is robust and has improved signal quality and increased resistance to multipath fading;
2) is suitable for varying channel conditions from pure Rayleigh to pure Rician with varying delay spread;
3) does not require channel state information;
4) has increased throughput and capacity compared to prior art methods.

These and other objects and advantages will be apparent upon reading the following description and accompanying drawings.

SUMMARY OF THE INVENTION

These objects and advantages are attained by a present method for wireless transmission of a digital bit stream. A digital bit stream is converted into a plurality of symbols. The symbols are sent to each of at least two diversity branches. The symbols are multiplied by a phase factor. The multiplication can be performed before or after the symbols are sent to the diversity branches. Finally, the symbols are transmitted from at least one of the diversity branches. Preferably, the symbols are transmitted from all the available diversity branches.

Alternatively, the symbols are grouped into frames. In this case, multiplication is performed by multiplying the frames by a matrix comprising phase factors. Also, the symbols can be cyclically shifted within the frame.

The phase factors can also be randomly selected. Preferably, the symbols are randomly selected when there is no available channel information (i.e. channel characteristic measurements are not available).

The symbols can also be multiplied by an amplitude factor. The amplitude factor can be randomly selected. The amplitude factor can be adjusted according to a channel characteristic (quality) measurement).

Each diversity branch may have a separate antenna.

Preferably, the phase factors are adjusted according to channel quality or channel characteristic measurements.

Another method according to the present invention includes converting a digital bit stream into a plurality of symbols grouped into a frame. The frame is sent to at least two diversity branches. A linear phase shift is incorporated into the frame. Finally, the frame is transmitted from at least one diversity branch. Preferably, the linear phase shift is different for each diversity branch. Also preferably, the frame is transmitted from all the diversity branches available.

Yet another method according to the present invention includes converting a digital bit stream into a plurality of symbols. The symbols are then converted into a frame using a serial to parallel converter. A cyclic shift is performed on the frame and the frame is sent to at least two diversity branches. Finally, the frame is transmitted from at least one diversity branch. Preferably, the cyclic shift is different for each diversity branch.

The frame can also be multiplied by phase factors and amplitude factors. The phase and amplitude factors can be randomly selected and can be adjusted in response to channel characteristic (quality) measurements.

The present invention includes an apparatus for adaptively selecting a wireless data transmission technique. The apparatus has a measuring means for measuring a wireless channel characteristic. Many different characteristics can be measured. The apparatus has a controller for receiving measurements from the measuring means. The apparatus also has a plurality of multipliers for multiplying the symbols by phase and amplitude factors. The multipliers are controlled by the controller. The multipliers are controlled in response to measurements made by the measuring means. The multipliers can be matrix multipliers. The apparatus can have a serial to parallel converter for grouping the symbols into frames.

The measuring means can measure many different channel characteristics or channel quality parameters including K factor, channel coefficient, signal quality, signal to interference noise ratio, level crossing rate, level crossing duration, and antenna correlation factor.

The present invention also includes an apparatus for wireless transmission of a digital bit stream. The apparatus has a means for producing a frame from a group of symbols. Also, the apparatus has at least 2 matrix multipliers for receiving and multiplying the frame by a matrix. The apparatus also has diversity branches for receiving multiplied frames and transmitting the frames. Each diversity branch is in communication with at least one matrix multiplier.

BRIEF DESCRIPTION OF THE FIGURES

The present invention may be better understood, and its numerous objects, features, and advantages made apparent to those skilled in the art by referencing the accompanying drawings. For simplicity and ease of understanding, the use of similar reference symbols in different drawings indicates similar or identical items.

DETAILED DESCRIPTION

Although the following detailed description contains many specifics for the purposes of illustration, one having ordinary skill in the art will appreciate that many variations and alterations to the following details are within the scope of the invention.

This invention describes a method and apparatus to carry out robust wireless communication through a channel in a multipath fading environment. The system is robust under a wide range of channel conditions. A first embodiment of the present method includes a step of imposing random phase and amplitude variations on a set of symbols being transmitted from different antennas.

Figure 1:
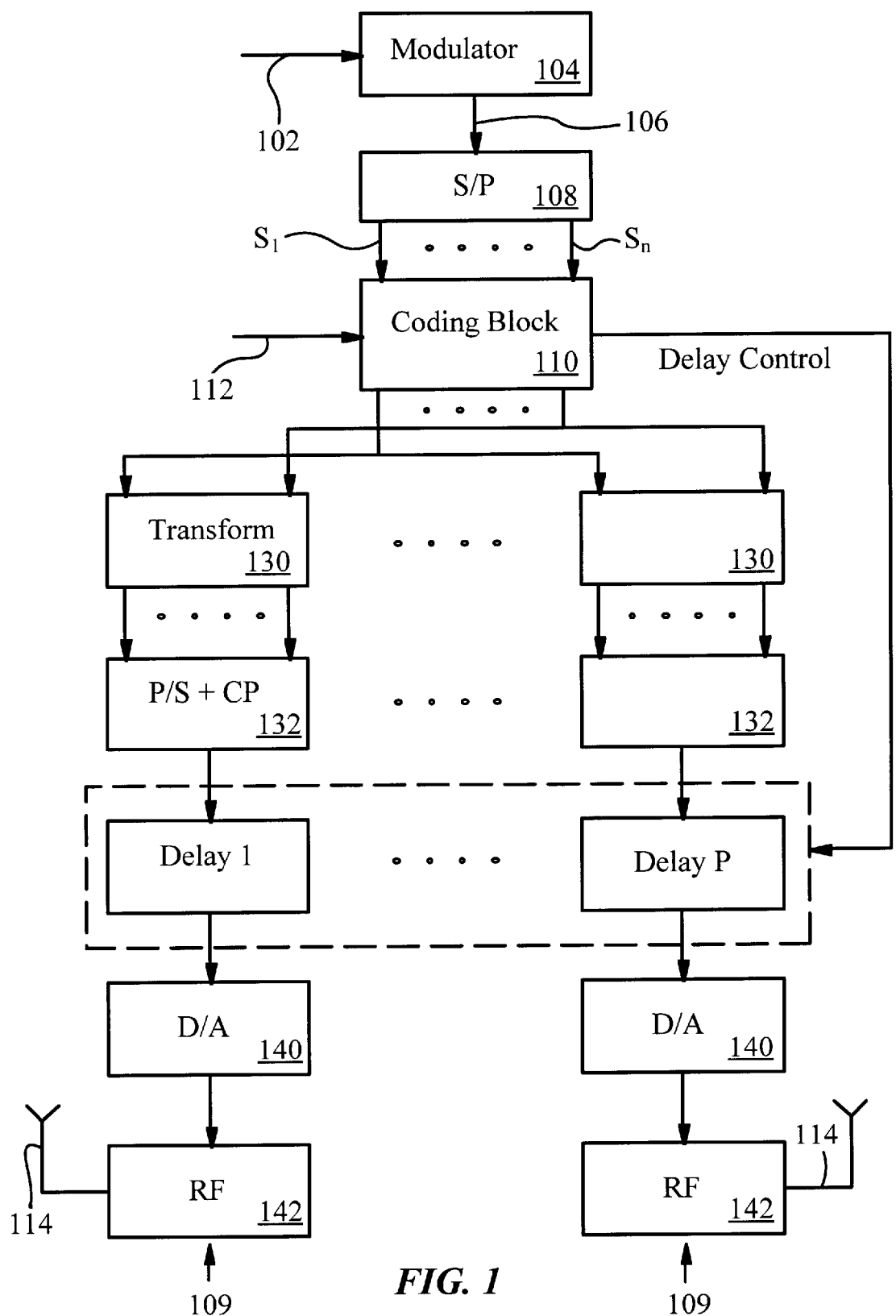
FIG. 1 is a block diagram of a transmit station, in accordance with an embodiment of the present invention.

FIG. 1 shows a block diagram of a transmit station in accordance with an embodiment of the present invention. After required coding and interleaving, a bitstream 102 of information is fed to a modulation block 104, which generates an output symbol stream 106 in response to bitstream 102. Symbol stream 106 is then fed to a serial to parallel converter 108, which collects a set of N symbols into a frame. These symbols may be complex in nature, for example in the case of QAM (quadrature amplitude modulation). The frame of symbols is fed to a coding block 110. Coding block 110 outputs are fed to P diversity branches 109.

Each diversity branch 109 has an antenna 114 for transmitting a signal. Each diversity branch 109 also has a unique delay (shown as delays 1–P) that is controlled by the coding block 110. Each of the P delays imposes a particular, unique amount of delay on the symbols being transmitted. The value of differential time delay between the diversity branches is preferably at least equal to the channel length (delay spread of the channel).

The complex symbols $\{S_1, S_2, \ldots, S_N\}$ are fed to a coding block 110, which is also configured to receive feedback 112 through a channel (not shown) from a remote receiver unit (not shown). The feedback provides the coding block with a measurement of the channel quality (characteristic) between the transmitter and receiver. Feedback 112 is optional. In certain cases, such as in a time division duplexed (TDD) system, the transmit station may not need feedback, as it is well known in the art that the channel is reciprocal, as long as round-trip transmission time is kept short. The transmit station can obtain channel characteristics from its associated uplink receiver (not shown). In certain other cases, feedback 112 is not available or feasible. Even when feedback is not available, the system performs well, as described below in more detail.

Figure 2:
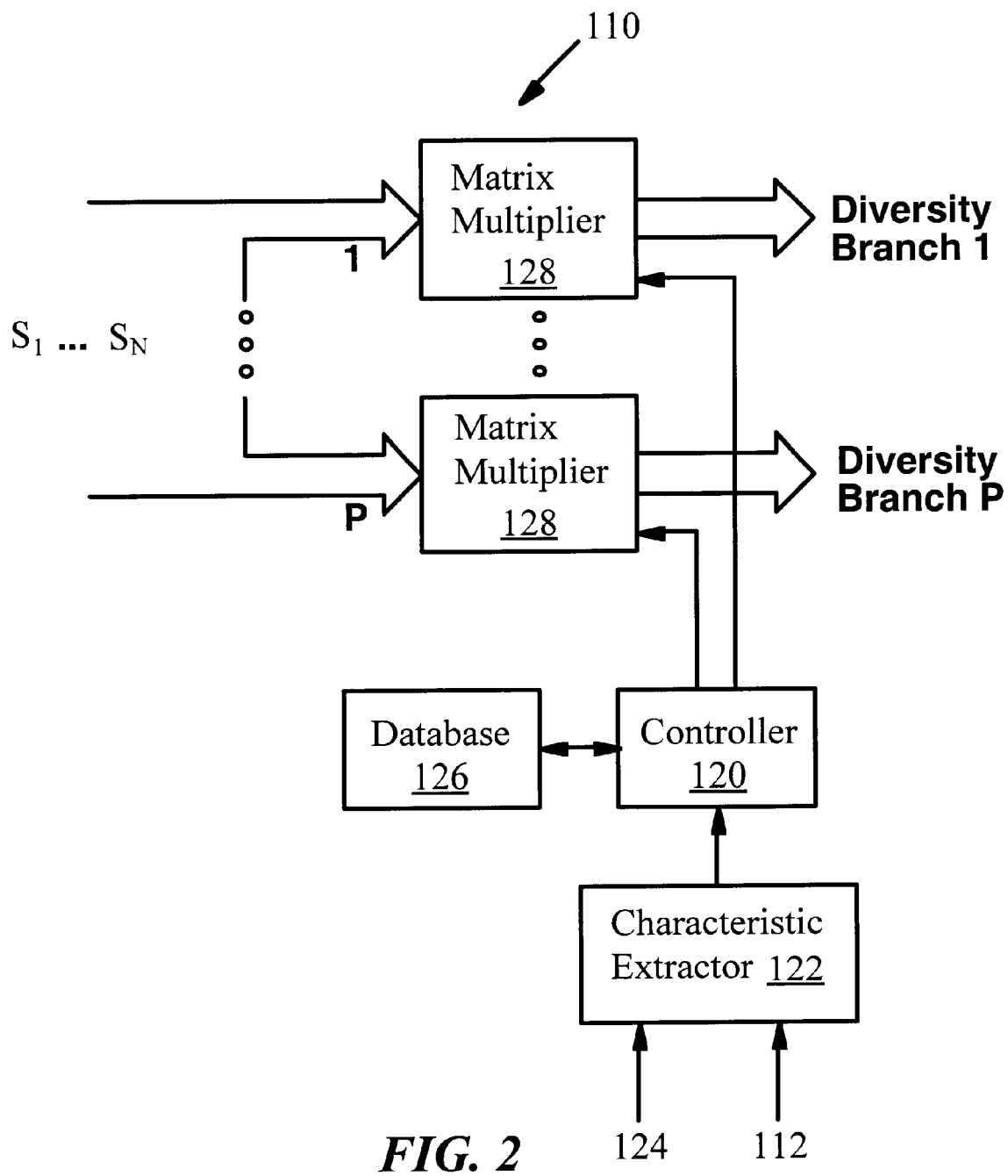
FIG. 2 is a more detailed block diagram of the coding block of FIG. 1.

FIG. 2 is a more detailed block diagram of coding block 110. A controller 120 controls the operation of the coding block component units. Controller 120 receives the channel characteristics from a channel characteristics extractor 122, which receives inputs 124 from the associated uplink receiver in case of TDD systems and feedback 112 from a remote downlink receiver when feasible in other cases. Therefore, when a channel is not reciprocal (as in TDD) and when feedback 112 is not available, channel characteristics extractor 122 produces no output. Channel characteristics can be, for example, a simple indication of type of channel (Rayleigh, Rician, or approximate value of K (Rician factor)), or in the best case a set of detailed channel coefficients. The channel characteristics can also be a signal quality, a signal to interference noise ratio, a level crossing rate, a level crossing duration, and an antenna correlation factor, for example.

Depending on the information available to controller 120 from channel characteristics extractor 122 (in some cases no information), controller 120 looks up a database 126, to choose the most suitable transform matrix (or matrices), and provides the matrices to matrix multipliers 128. The number of matrix multipliers 128 is equal to the number of diversity branches P, which may be equal to the number of transmitting antennas 114 (see FIG. 1). The output of each matrix multiplier is provided to each diversity branch. In case the detailed channel coefficients are available to controller 120, for example, equal gain processing (combining) or maximal ratio processing (combining) matrices can be computed by controller 120 and provided to matrix multipliers 128.

Figure 3:
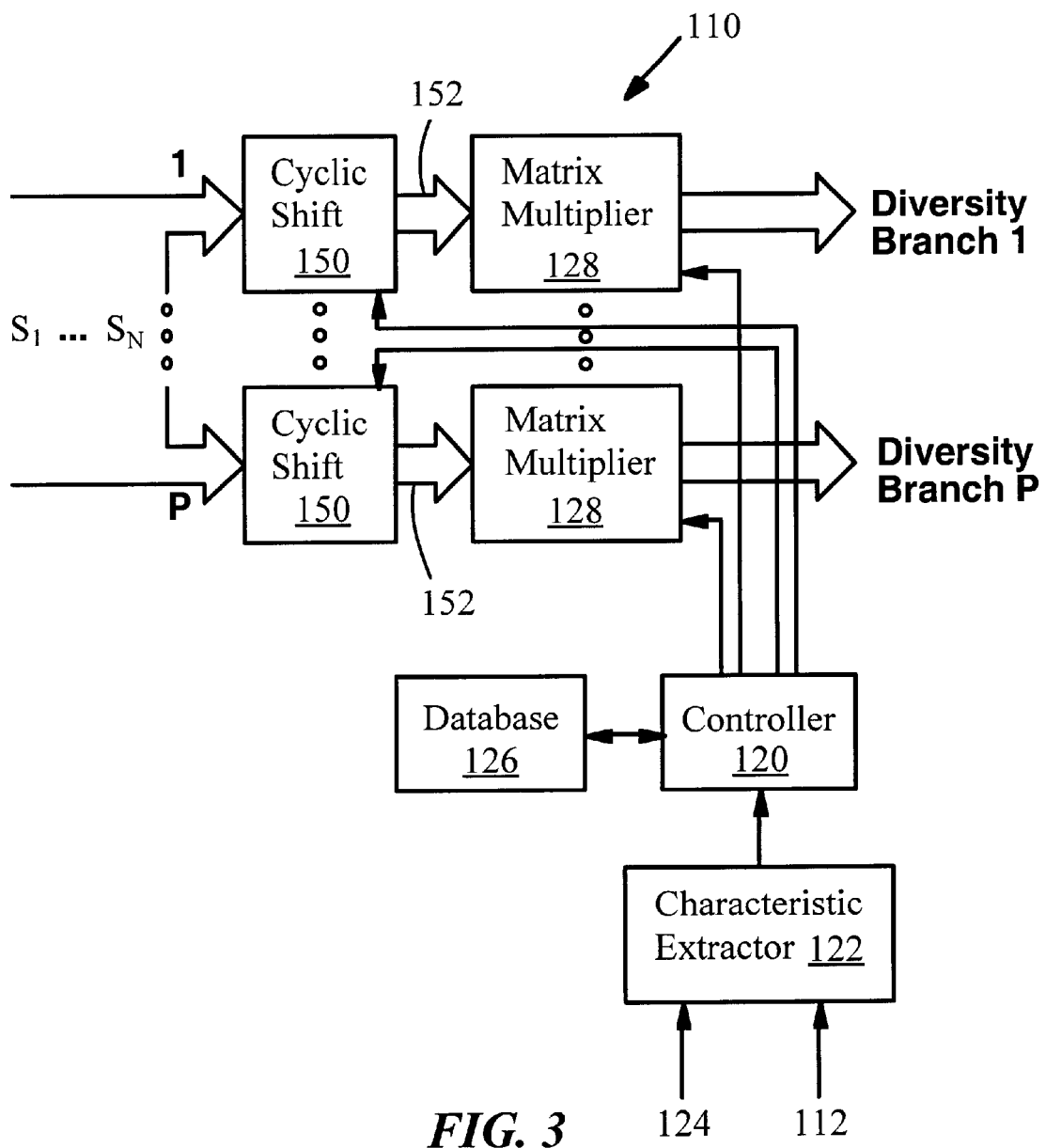
FIG. 3 is a block diagram of an alternative embodiment where a cyclic shift is used.

FIG. 3 is a block diagram illustrating the operation of coding block 110 in the cases where no channel information is available. A frame of complex symbols $\{S_1, \ldots, S_N\}$ is fed to each diversity branch 109 (FIG. 1) in parallel. Each frame of symbols goes through a cyclic shift in a shift block 150 before matrix multiplication in the matrix multipliers 128. The controller 120 controls the action of the shift blocks 150. The amount of cyclic shift can be different for different diversity branches and this can further change from frame to frame.

Figure 4:
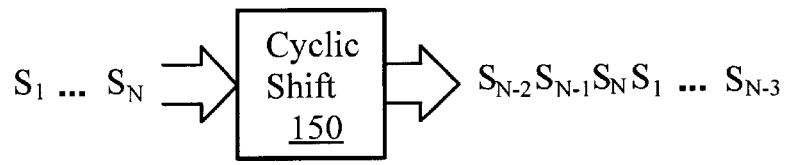
FIG. 4 illustrates a cyclic shift that can be used according to the present invention.

FIG. 4 illustrates a cyclic shift that can be used in the present invention. In the cyclic shift illustrated, the frame is cyclically shifted by 3 symbols.

The cyclic shift introduces a dependency in time between symbols transmitted from different antennas. At the receiver, this dependency in time can be used to obtain coding and diversity gain. For simplicity, a system with two transmit antennas is considered. On a first antenna, a set of symbols $\{s(n)\}$ is passed, where $\{n=0 \ldots N-1\}$ after necessary modulation. On a second antenna, a set of symbols $\{s(n-k)\}$ is passed, where (n-k) is taken modulo N.

This process introduces a dependency in time between the symbols transmitted on first and second antennas. With an appropriate receiver this redundancy can be used to obtain diversity and/or coding gain. Since we are introducing memory in the transmitted signal, an optimal receiver performs maximum likelihood sequence estimation. The exact implementation, or simplifications, depend on the specific type of encoder. For example, in the present embodiment the received sequence can be represented as follows:

$$X(n)=H\_1(n)S(n)+H\_2(n)S(n-k)+v(n),$$

where $H\_1(n)$ and $H\_2(n)$ are the respective channel coefficients between first transmit antenna and receive antenna and between second transmit antenna and receive antenna, and $v(n)$ is the additive white Gaussian noise.

If for example k=1, then the above simplifies to:

$$X(n)=H\_1(n)S(n)+H\_2(n)S(n-1)+v(n).$$

Decoding proceeds as follows. Given $S(0)$ one can find the best $S(1)$ that most closely matches the received signal $X(1)$. Then, using this $S(1)$, one finds the best $S(2)$ that matches $X(2)$, and so on. With the appropriate metric this is the standard Viterbi algorithm. Because the shift is circular, knowledge of $S(0)$ is not required, and $S(0)$ can be found from $X(0)=H\_1(0)S(0)+H\_2(0)S(N-1)$.

Thus by introducing memory, the distance between error sequences is increased (e.g., an error will occur if there is an error in both $S(m)$ and $S(m+k)$ for some m). This allows an increase in the coding gain. It also gives an increase in diversity gain. One can obtain diversity gain directly using a Viterbi decoder. FEC and interleaving will further improve performance. In that case, two MLSE receivers may be required, one for the cyclic shift, and one for the convolutional FEC.

Referring again to FIG. 3, the cyclically shifted symbols 152 from each diversity branch then undergo a multiplication with a matrix in each matrix multiplier 128, which ensures complex multiplication of each symbol. This matrix may be represented as shown below for one representative diversity branch.

$$\begin{bmatrix} a_1 e^{j\varphi_1} & 0 & 0 & \cdots & 0 \\ 0 & a_2 e^{j\varphi_2} & 0 & \cdots & 0 \\ \vdots & 0 & \ddots & & \vdots \\ 0 & \vdots & & \ddots & 0 \\ 0 & 0 & \cdots & 0 & a_N e^{j\varphi_N} \end{bmatrix}$$

In the above matrix, each $a_i$ represents a scaling factor and each $\phi_i$ represents a corresponding phase shift. The detailed choice of matrix depends on the nature of the feedback. Due to the complex multiplication in matrix multiplier 128, each symbol in a cyclically shifted frame 152 goes through an individual scaling and phase rotation. Each diversity branch can have a different set of scaling and phase rotation values. These values can change from frame to frame. These complex numbers are substantially random, i.e. stochastic in nature, but are known to the corresponding remote receivers. The patterns of change from frame to frame are also known to the receivers. This semi-random scaling and phase rotation randomizes frequency dependent fading and reduces the probability of frequency selective nulls to a very low value.

Along with interleaving, coding, and diversity transmission, reliable communication can be carried out over a wide range of channel conditions without requiring feedback by the above described method. Without the above mentioned randomization on the data in a Rician channel, for example, diversity transmission can harm the communication by causing frequency dependent fading and nulls. Embodiments of the present invention solve the above problem. Whether the channel is Rician or Rayleigh, reliable communication is made possible by using the techniques of the present invention.

Controller 120 is also equipped with a capability to disable diversity transmission, if there is prior knowledge or feedback that the channel is Rician (high K factor). The multi-datastream output of coding block 110 is fed to transform blocks 130 (see FIG. 1), where each data frame is multiplied by a transform matrix. This transformation maps an input frame of N complex values into M values, where $M \geq N$. The transform matrix can be an IFFT (Inverse Fast Fourier Transform) at the transmit station and FFT (Fast Fourier Transform) at the receiver, or alternatively any other transform which diagonalizes the matrix of channel coefficients, for example matrix T'HT is a diagonal matrix, where T is a transform matrix, T' is the hermitian of T, and H is the matrix of channel coefficients.

Certain subsets of Walsh-Hadamard codes, well known in the art, can for example be applied as the above transforms, as described in the paper "A Low Complexity Multi-Code Modulation Technique for Wireless LANs" by A. Chini et al., IEEE ICPWC'96, pp. 206–209.

Even transforms which only approximately diagonalize the matrix of channel coefficients can be used, but along with an equalizer with a few taps. When the transform is IFFT, then M=N. In other cases M can be greater than N, such as in the case of Walsh-Hadamard code subsets. Here, the Walsh codes can be chosen such that the signal can be spread in frequency domain. This spreading at the transmitter will be followed by a de-spreading at the receiver resulting in a processing gain, thus providing higher signal quality and immunity to noise, co-channel interference etc. To enable CCI immunity the selection of codes at co-channel transmitters should be done in such a way that their cross-correlation is minimal like in a usual CDMA system. After the transformation of each datastream, the transformed coefficients are passed through a parallel-to-serial converter block 132, shown in FIG. 1, where a cyclic prefix equal in symbol length to L−1 can be added, where L corresponds to channel length and the delay introduced into the diversity branches. This cyclic prefix is a repetition of the first L−1 transformed coefficients. The role of the prefix is to avoid interference between consecutive frames and also to convert the linear convolution of the data sequence with the discrete channel coefficients into a circular convolution. The resulting M+L−1 complex valued symbols of each diversity branch go through individual delays. The amount of delay can be controlled by coding block 110 based on the feedback regarding the channel length if available.

The control of diversity parameters for example in the present embodiment time delay, in a judicious way based on the information about the channel characteristics (delay spread values in this case) can improve the effect of diversity as well as reduce the overhead resulting in a higher throughput.

The reduction of overhead is brought about in the present case as follows. As explained before the amount of cyclic prefix added to each transformed frame of symbols depends on the channel length (delay spread) and the physical time delay introduced in the diversity branches. Also note that to have effective diversity gain the differential delays may be chosen to be equal to the channel delay spread. Therefore, the cyclic prefix may be equal to integer multiples of channel delay spread in this extreme case. If we have knowledge of the channel delay spread, then it can be ensured that the cyclic prefix is adjusted accordingly, rather than keeping it proportional to the maximum expected delay spread. The cyclic prefix being an overhead, adjusting its value adaptively increases the throughput. This explanation is true in case physical time delay is introduced in the diversity branches.

It is also possible to move the delaying operation in time domain to the frequency domain. In that case, similar effects may be achieved by introducing a linear phase rotation to the frame of symbols before transformation. This effectively does not introduce a physical time delay but a virtual equivalent effect. Therefore, there is no need of increasing the cyclic prefix. This can also result in an increase in throughput.

In addition to the cyclic prefix an additional overhead of cyclic suffix may be added to take care of out of band spectral spill etc.

As shown in FIG. 1, after the above diversity operations the symbols are then converted to analog values in D/A converter blocks 140 and then are modulated onto the carrier frequency at modulation blocks 142. Then the signals go through required RF amplification and are fed to the respective antennas 114 for transmission.

Figure 5:
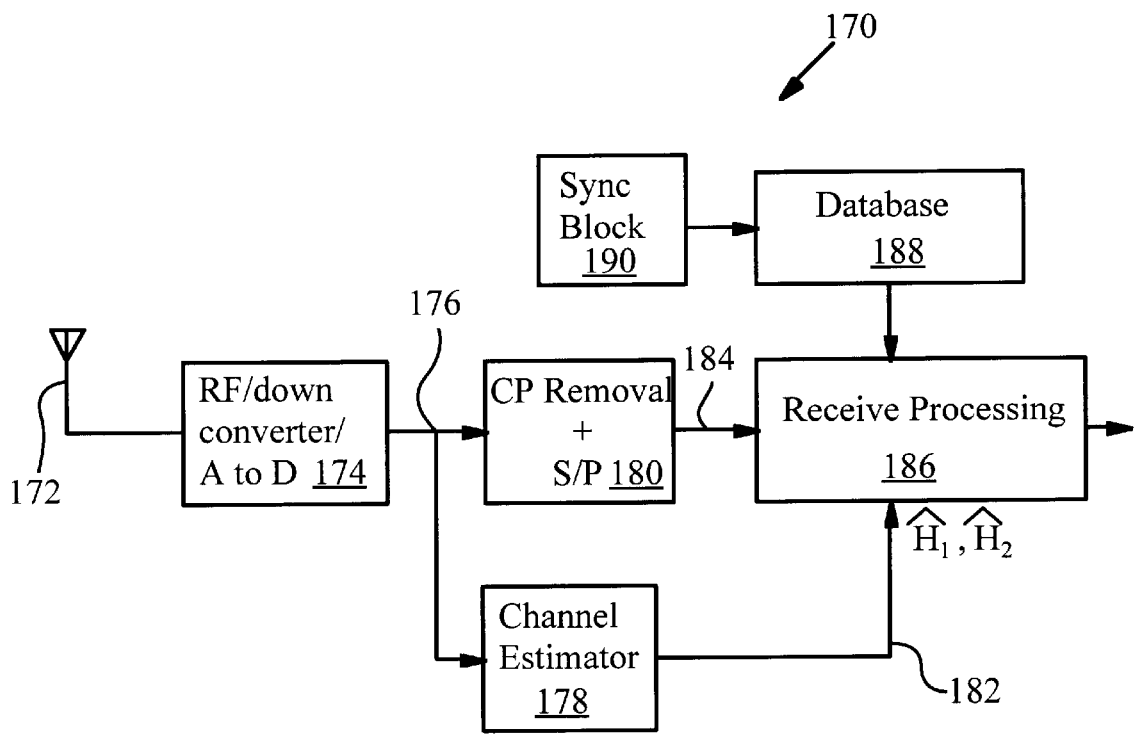
FIG. 5 is a block diagram illustrating an implementation of a receiver in an embodiment of the present invention.

FIG. 5 is a block diagram illustrating an implementation of a receiver 170 in an embodiment of the present invention. FIG. 5 shows only a single channel receiver, which can readily be extended by one having ordinary skill in the art to a multichannel receiver. Multichannel receivers have multiple antennas and corresponding channels, in case receive antenna diversity, for example, is implemented. Signals from a receiving antenna 172 are amplified, downconverted, and digitized in a signal processing block 174. The digitized signal 176 is provided in parallel to a channel estimator 178 and to a serial-to-parallel converter 180. Channel estimator 178 produces multichannel estimates $\{H_i\}$ 182, where each $H_i$ is the estimate for a channel between the $i^{th}$ transmitting antenna (not shown) and receiving antenna 172. This is accomplished, for example, by the process described below.

A training unit at the transmitter, well known in the art (not shown) sends out training patterns periodically. Channel estimator 178 recognizes these training patterns and uses a technique known in the art to evaluate these channel estimates, for example, LS estimation.

Serial-to-parallel converter 180 converts the serial data into parallel format and strips off any cyclic prefix that was applied at the transmitter. It is assumed that the required frame synchronization and carrier frequency synchronization is carried out, as is common in the art of wireless communication.

The received signal $Y = S'(J_1 \Delta_1 T'H_1 + J_2 \Delta_2 T'H_2 + \ldots + J_n \Delta_n T'H_n) + N$, Where:

S is the transmitted symbol vector $[S_1, S_2, \ldots, S_n]$

S' is the transpose of S $J_i$ is the cyclic shift matrix of the $i^{th}$ transmitter channel $\Delta_i$ is the scaling and phase rotation matrix of the $i^{th}$ transmitter channel T is the transform matrix T' is the transpose of T $H_i$ is the channel coefficient between the $i^{th}$ transmitting antenna and the receiving antenna N is the additive white Gaussian noise (AWGN)

The data frame (minus any cyclic prefix and cyclic suffix) 184 is fed to a receiver processing unit 186, where the data is post-multiplied by the transform T, resulting in $$YT=S'(J_1\Delta_1T'H_1T+ \ldots +J_i\Delta_iT'H_iT+ \ldots )+N'$$

If there was no cyclic shift performed at the transmitter, i.e. the $J_i$ are identity matrices, then final processing and detection can be done by any one of many techniques known in the art, such as zero forcing (ZF), minimum mean square error (MMSE), maximum likelihood sequence estimator (MLSE), least squares (LS), etc. This can be done by using the channel coefficient estimates $H_i$ and matrices $J_i \times \Delta_i$ stored in a database 188. It is assumed that receiver database 188 is an accurate replica of the transmitter database 126, and that receiver database 188 and transmitter database 126 work in cooperation with one another, e.g., by means of a sync block 190.

For example, in case of ZF implementation, processing can be performed by calculating the inverse of the term in parentheses above, and multiplying by the transform YT. If a cyclic shift is also performed, then the receiver may in addition need to implement MLSE.

Figure 6:
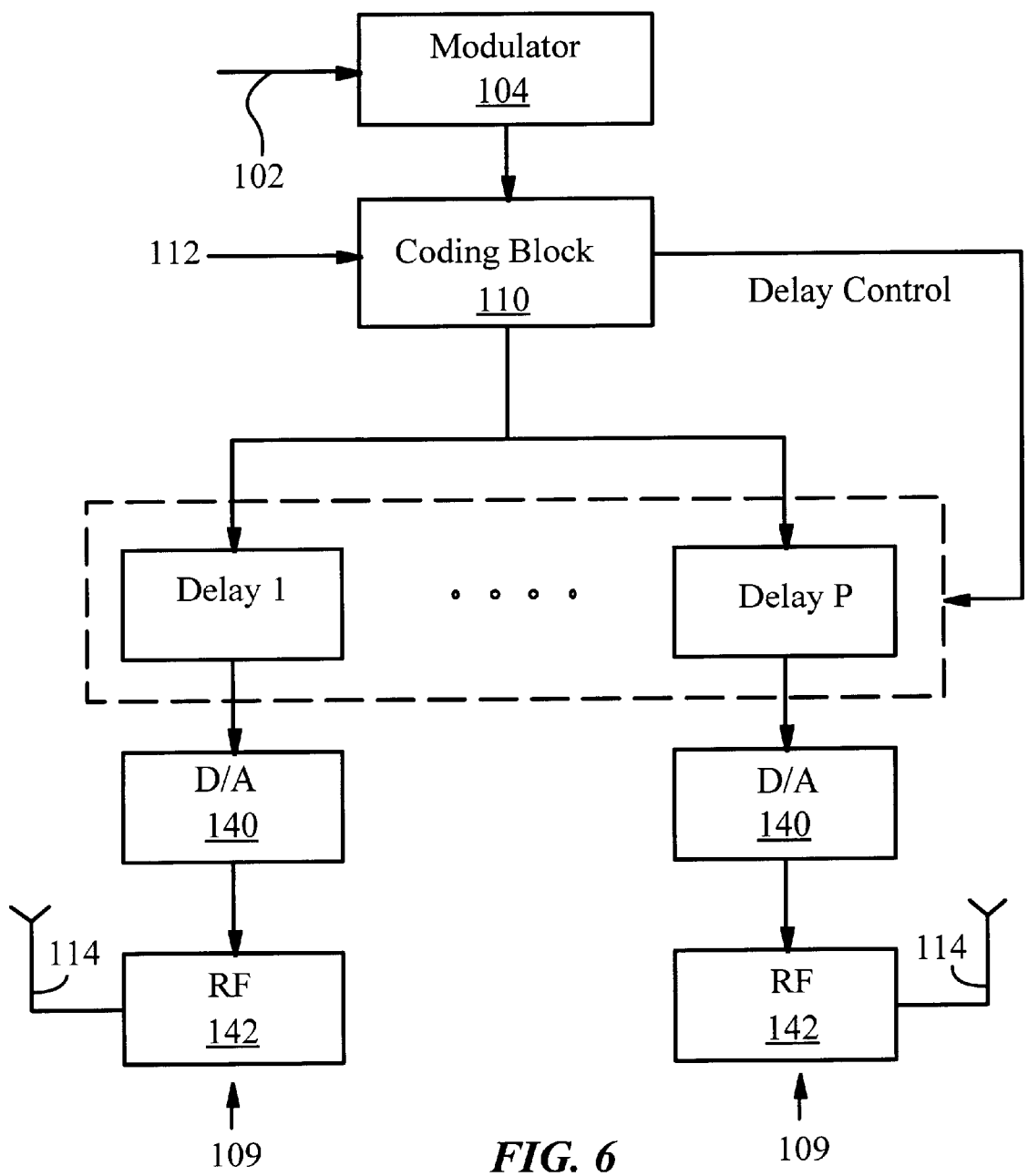
FIG. 6 shows an embodiment of the present invention where symbols are not grouped into frames before being processed.

FIG. 6 shows an alternative embodiment of the present invention where symbols are not grouped into frames. Symbols enter the coding block as a symbol stream and no serial-to-parallel converter is needed. Since frames are not used in this embodiment, symbols go directly from the coding block 110 to the diversity branches and delay units.

Figure 7:
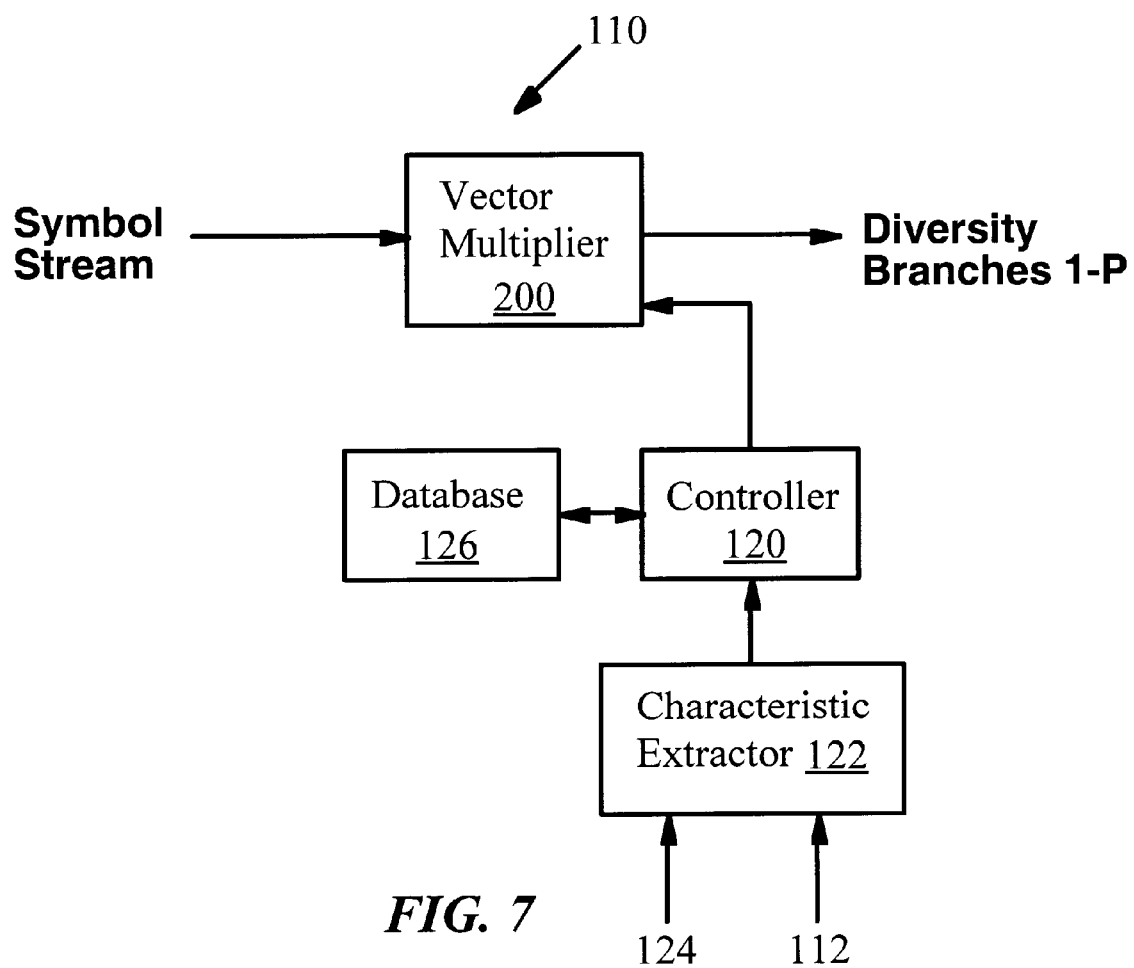
FIG. 7 shows a coding block according to the embodiment of FIG. 6.

FIG. 7 shows a simplified coding block used in the embodiment of FIG. 6. Here, the matrix multipliers 128 are replaced with a single vector multiplier 200. The output of the vector multiplier 200 is sent to all the diversity branches 109. The controller 120 determines the vector that is used by the vector multiplier when multiplying the symbols.

It will be obvious to those skilled in the art that FIGS. 6 and 7 show a general case which encompasses single carrier kind of modulation systems. Whereas the other embodiment describes a general case where multi-carrier, discrete multi-tone, OFDM etc kind of modulation systems.

The embodiments of the invention can be used in conjunction with any kind of access techniques such as TDMA, FDMA, CDMA, OFDMA or any combination of such techniques.

It will be recognized by one skilled in the art that the above embodiment may be altered in many ways without departing from the scope of the invention. Accordingly, the scope of the invention should be determined by the following claims and their legal equivalents.

What is claimed is:

1. A method for wireless transmission of a digital bit stream, comprising the steps of:

a) converting the bit stream into a plurality of symbols;

b) sending the symbols to each of at least two diversity branches;

c) multiplying the symbols in each diversity branch by a phase factor;

d) transmitting the symbols from at least one diversity branch after steps (a)–(c);

wherein the symbols are grouped into frames before step (b), and wherein step (c) is performed by multiplying each frame by a matrix;

wherein the method further comprises the step of cyclically shifting symbols within each frame.

2. A method for wireless transmission of a digital bit stream, comprising the steps of:

a) converting the bit stream into a plurality of symbols;

b) sending the symbols to each of at least two diversity branches;

c) multiplying the symbols in each diversity branch by a phase factor;

d) transmitting the symbols from at least one diversity branch after steps (a)–(c);

wherein the phase factors are randomly selected.

3. A method for wireless transmission of a digital bit stream, comprising the steps of:

a) converting the bit stream into a plurality of symbols;

b) sending the symbols to each of at least two diversity branches;

c) multiplying the symbols in each diversity branch by a phase factor;

d) transmitting the symbols from at least one diversity branch after steps (a)–(c);

further comprising the step of multiplying the symbols in each diversity branch by an amplitude factor;

wherein the amplitude factor is randomly selected.

4. A method for wireless transmission of a digital bit stream, comprising the steps of:

a) converting the bit stream into a plurality of symbols;

b) sending the symbols to each of at least two diversity branches;

c) multiplying the symbols in each diversity branch by a phase factor;

d) transmitting the symbols from at least one diversity branch after steps (a)–(c);

wherein a different phase factor is used in each diversity branch.

5. A method for wireless transmission of a digital bit stream, comprising the steps of:

a) converting the bit stream into a frame comprising a plurality of symbols;

b) performing a cyclic shift on the frame;

c) sending the frame to each of at least two diversity branches;

d) transmitting the frame from at least one diversity branch after steps (a)–(c);

further comprising the step of multiplying the frame in each diversity branch by a phase factor, wherein a different phase factor is used in each diversity branch;

wherein the phase factors are randomly selected.

6. A method for wireless transmission of a digital bit stream, comprising the steps of:

a) converting the bit stream into a frame comprising a plurality of symbols;

b) performing a cyclic shift on the frame;

c) sending the frame to each of at least two diversity branches;

d) transmitting the frame from at least one diversity branch after steps (a)–(c);

further comprising the step of multiplying the frame by a randomly selected amplitude factor.

7. The method of claim 6 wherein the amplitude factor multiplication step is performed before step (d) such that each diversity branch is associated with the same set of amplitude factors.

8. A method for wireless transmission of a digital bit stream, comprising the steps of:
  a) converting the bit stream into a frame comprising a plurality of symbols;
  b) performing a cyclic shift on the frame;
  c) sending the frame to each of at least two diversity branches;
  d) transmitting the frame from at least one diversity branch after steps (a)–(c);
  further comprising the step of measuring a wireless channel characteristic between each diversity branch and a receiver;
  further comprising the step of adjusting the cyclic shift in response to the channel characteristic measurement.

9. An apparatus for adaptively selecting a wireless digital data transmission technique for transmitting digital data represented as symbols, comprising:
  a) a measuring means for measuring a wireless channel characteristic;
  b) a controller for receiving measurements from the measuring means;
  c) a plurality of multipliers for multiplying the symbols by phase and amplitude factors,
  wherein the multipliers are controlled by the controller, and wherein the multipliers are controlled in response to measurements produced by the measuring means;
  wherein the measuring means is for measuring a characteristic selected from the group consisting of a K factor, a channel coefficient, a signal quality, a signal to interference noise ratio, a level crossing rate, a level crossing duration, and an antenna correlation factor.

10. An apparatus for wireless transmission of a digital bit stream, comprising:
  a) a means for producing a frame from a group of symbols derived from the bit stream;
  b) P matrix multipliers for receiving and multiplying the frame, wherein each of the P multipliers multiplies the frame by a matrix, where P is an integer greater than 1;
  c) P diversity branches for receiving multiplied frames from the matrix multipliers, wherein each diversity branch is in communication with a different matrix multiplier.

11. The apparatus of claim 10 wherein each diversity branch comprises a time delay for delaying the frame from the matrix multipliers.

* * * * *